United States Patent
Park et al.

(10) Patent No.: US 8,290,651 B2
(45) Date of Patent: Oct. 16, 2012

(54) METHOD FOR REDUCING VIBRATION CAUSED BY GEAR BACKLASH IN DRIVE SYSTEM FOR HYBRID VEHICLE

(75) Inventors: Joon Young Park, Seoul (KR); Tae Wook Park, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 598 days.

(21) Appl. No.: 12/546,939

(22) Filed: Aug. 25, 2009

(65) Prior Publication Data

US 2010/0235027 A1    Sep. 16, 2010

(30) Foreign Application Priority Data

Mar. 16, 2009 (KR) .................. 10-2009-0022104

(51) Int. Cl.
*G06F 19/00* (2006.01)
(52) U.S. Cl. ....................................... 701/22; 180/65.21
(58) Field of Classification Search ............. 701/22, 701/51; 180/65.21
See application file for complete search history.

(56) References Cited

U.S. PATENT DOCUMENTS

| 5,918,573 | A  | * | 7/1999 | Killion ............... 123/192.2 |
| 6,377,882 | B1 | * | 4/2002 | Ito ......................... 701/51 |
| 7,110,867 | B2 | * | 9/2006 | Imazu .................... 701/22 |
| 7,766,789 | B2 | * | 8/2010 | Iwase et al. ............. 477/3 |

FOREIGN PATENT DOCUMENTS

| JP | 1-180613   | A | 7/1989  |
| JP | 9-305239   | A | 11/1997 |
| JP | 11-065604  | A | 3/1999  |
| KR | 0154224    |   | 7/1998  |

* cited by examiner

*Primary Examiner* — Yonel Beaulieu
(74) *Attorney, Agent, or Firm* — Edwards Wildman Palmer LLP; Peter F. Corless

(57) ABSTRACT

The present invention provides a method for reducing the vibration caused by gear backlash in a drive system for a hybrid vehicle, where the method can preferably reduce backlash vibration caused by gear elements between a motor and driving wheels when the hybrid vehicle is driven by the motor.

11 Claims, 6 Drawing Sheets

METHOD FOR REDUCING VIBRATION CAUSED BY GEAR BACKLASH IN DRIVE SYSTEM FOR HYBRID VEHICLE

CROSS-REFERENCE TO RELATED APPLICATION

This application claims under 35 U.S.C. §119(a) the benefit of Korean Patent Application No. 10-2009-0022104 filed Mar. 16, 2009, the entire contents of which are incorporated herein by reference.

BACKGROUND (a) Technical Field

The present disclosure relates to a method for reducing the vibration caused by gear backlash in a drive system for a hybrid vehicle. More particularly, the present invention relates to a method for reducing the vibration that is caused by gear backlash in a drive system for a hybrid vehicle. Preferably, the present invention features methods that can reduce backlash vibration that is caused by gear elements between a motor and driving wheels when the hybrid vehicle is suitably driven by the motor.

(b) Background Art

Various types of hybrid vehicles such as fuel cell hybrid vehicles, plug-in hybrid vehicles, hybrid electric vehicles, etc. have an electric vehicle (EV) mode, in which the vehicle is driven only by an electric motor that suitably converts electrical energy from a high voltage battery into mechanical energy, and a regenerative braking (RB) mode, in which the mechanical energy of an engine and driving wheels is suitably recovered (or regenerated) by the electric motor, suitably converted into electrical energy by an inverter, and suitably stored in an energy storage device such as a battery.

Preferably, these hybrid vehicles include various gear elements having, for example, backlash characteristics such as a transmission, a final reduction gear, etc. between the electric motor and the driving wheels. However, the hybrid vehicles are not sufficiently equipped with damping elements such as a torsional damper that suitably absorbs the backlash of these gear elements, and thus vibration is generated when the direction of effective torque is changed by the gear elements.

Accordingly, vibration is generated mainly during creep running due to accumulation of backlash of the gear elements between the motor and the driving wheels, which as a result has an effect on the driving performance of the vehicle, and may be contrary to the users' expectation of environmentally-friendly vehicles.

A backlash mechanism, which is a phenomenon in which, for example, the backlash of the gear elements between the motor and the driving wheels occurs during the EV mode in which the vehicle is preferably driven only by the motor, will be described with reference to FIG. 1 below.

FIG. 1 is a schematic diagram showing gears suitably modeled as a spring system.

It takes a certain amount of time for the motor torque to be suitably transmitted to a drive shaft. Accordingly, the required time may be explained as the time required for the gears such as an automatic transmission to be suitably aligned in the driving direction, i.e., as a delay time due to the gear backlash and a gap between the respective gears.

As shown in FIG. 1, a dead zone of the motor torque is suitably created by a gap 30 preferably formed by a gear tooth between a first gear 10 and a second gear.

The motor torque preferably passing through the dead zone by the gear tooth is shown as a dashed-dotted line in FIG. 2, from which it can be seen that the motor torque transmission is suitably interrupted by the gear backlash unlike the linear torque (shown as a dotted line in FIG. 2) that is normally transmitted.

The vibration generated when the direction of the effective torque is suitably changed by the gear elements is described with reference to FIG. 1 below.

As shown in FIG. 1, where the gears are modeled as an exemplary spring system, vibration is suitably generated in the spring system at a point of time when the direction of the effective torque between the first and second gears is preferably changed.

That is, the torque is preferably transmitted to the second gear 20 when the first gear 10 suitably operates in the arrow direction. However, as shown in the spring system of FIG. 1, vibration is suitably generated in the spring system during the torque transmission due to "compression release of a front spring 40", "a physical gap 30 between first and second gears", and "compression of a rear spring 50". As a result, vibration is suitably generated when the direction of the effective torque is changed by the gear elements.

Accordingly, when the torque is suitably transmitted from the first gear 10 to the second gear 20, the region in which "the compression release of the front spring 40", "the physical gap 30 between first the and second gears", and "the compression of the rear spring 50" are made preferably corresponds to a null torque zone.

Preferably, the torque range is in the null torque zone where, preferably, "the compression release of the front spring 40", "the physical gap 30 between first the and second gears", and "the compression of the rear spring 50" are suitably made is considerably less than a significant torque level (e.g., 5 Nm with respect to a transmission input shaft).

As a result, the motor torque transmission is interrupted by the gear backlash and thus vibration is generated, which effects the driving performance of the vehicle.

Conventionally, various methods have been proposed to address the vibration that is generated, such as, but not limited to, a passive damping method that suitably applies a physical damping element such as a torsional damper, an active damping method of a closed loop type that suitably exerts a damping force in the reverse direction of vibration, and a torque profile control method that suitably suppresses the occurrence of vibration by changing the input torque of the backlash mechanism. In the case of the passive damping method, it is difficult to solve a packaging problem for the drive system including the gear elements. In the case of the active damping method, it is necessary to separately configure a high-performance sensor and an observer. Also, in the case of the torque profile control method, it may reduce the vibration due to a reduction in torque change rate to some degree; however, the response deteriorates, and the vibration may increase due to a model error when the reverse phase torque based on the vibration model is added.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

In a first aspect, the present invention provides a method for reducing the vibration caused by gear backlash in a drive system for a hybrid vehicle, in which, when a motor torque is suitably input to gear elements having a gear backlash mechanism, a motor torque command within a null torque by the gear backlash is suitably output as an effective torque of 0 (zero) and the effective torque is suitably restricted using a parabolic or exponential function, thus reducing the amplitude of vibration and suitably preventing deterioration of torque response.

Preferably, the present invention provides a method for suitably reducing vibration caused by gear backlash in a drive system for a hybrid vehicle, the method preferably including: a first step of determining whether an effective torque command, which is a value suitably obtained by subtracting a drag torque from a motor torque command, enters or leaves a null torque zone of a gear backlash mechanism; and a second step of initializing a control time and suitably performing a control to restrict the effective torque to have a parabolic or exponential torque, if it is determined that the effective torque command enters or leaves the null torque zone.

In a preferred embodiment, the first step determines whether the effective torque command enters or leaves the null torque zone of the gear backlash mechanism by calculating whether the motor torque command (driver request torque) $T_{in}$ is greater than a sum $(T_{dead}/2+T_{drag})$ of a half of the null torque zone $T_{dead}$ and the drag torque $T_{drag}$ and whether a $T_{in}$ value of the previous sample time $T_{in\_old}$ is smaller than or equal to the sum $(T_{dead}/2+T_{drag})$ of the half of the null torque zone $T_{dead}$ and the drag torque $T_{drag}$; or by calculating whether the motor torque command (driver request torque) $T_{in}$ is smaller than a sum $(-T_{dead}/2+T_{drag})$ of the other half of the null torque zone $T_{dead}$ and the drag torque $T_{drag}$ and whether the $T_{in}$ value of the previous sample time $T_{in\_old}$ is greater than or equal to the sum $(-T_{dead}/2+T_{drag})$ of the other half of the null torque zone $T_{dead}$ and the drag torque $T_{drag}$.

In another preferred embodiment, in the second step, when the effective torque leaves the null torque zone, a final motor torque command value $T_{out}$ is preferably subjected to a parabolic torque restriction control in which the effective torque suitably increases in the form of a parabolic curve by $[T_{out}=(T_{in}-T_{drag})*t^2/t_{max}^2+T_{drag}]$.

In still another preferred embodiment, in the second step, when the effective torque enters the null torque zone, the effective torque has a curve in the form of $1-\exp(-\alpha t)$ using an exponential function and is suitably converged to the drag torque.

In yet another preferred embodiment, the method preferably further includes the step of determining whether the parabolic torque restriction control is suitably performed and, if the effective torque command value exists in the null torque zone, preferably stopping the parabolic torque restriction control to determine the final motor torque command $T_{out}$ as the drag torque $T_{drag}$.

In still yet another preferred embodiment, the method further includes the step of stopping the parabolic torque restriction control to determine the final motor torque command $T_{out}$ as the motor torque $T_{in}$, if the effective torque command value suitably leaves the null torque zone and thus the control time elapses.

Other aspects and preferred embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum).

As referred to herein, a hybrid vehicle is a vehicle that has two or more sources of power, for example both gasoline-powered and electric-powered vehicles.

The above and other features of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
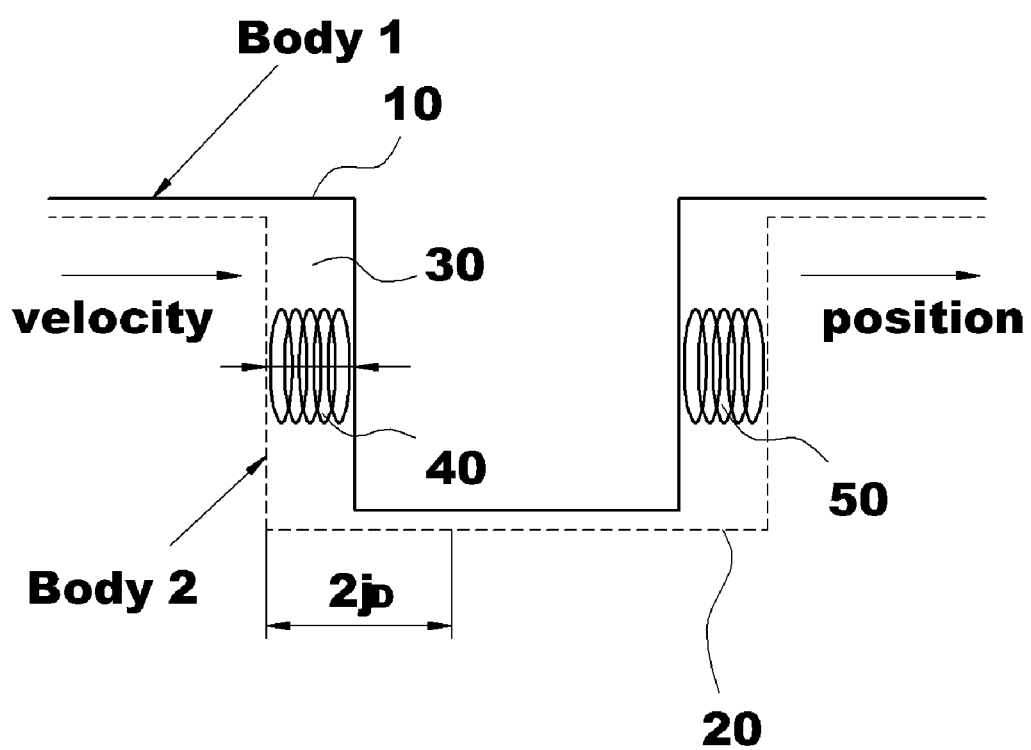
FIG. 1 is a schematic diagram showing gears according to preferred embodiments of the invention that are modeled as a spring system to illustrate gear backlash and vibration caused by the gear backlash.
Figure 2:
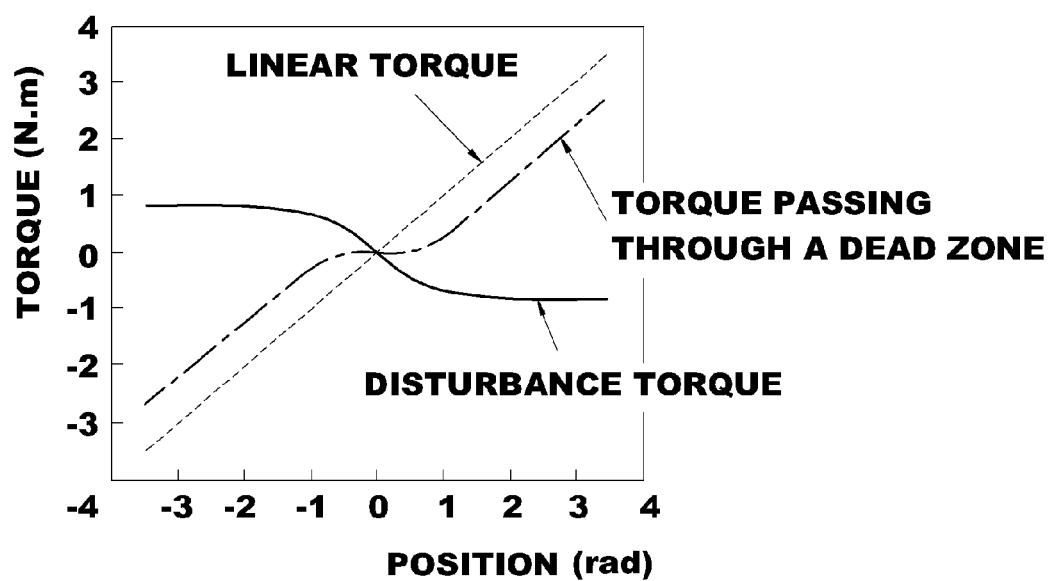
FIG. 2 is a torque waveform diagram comparing a motor torque passing through a dead zone created by a gap between gears with a linear torque normally transmitted.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

As described herein, the present invention includes a method for reducing vibration caused by gear backlash in a drive system for a hybrid vehicle, the method comprising a first step of determining whether an effective torque command enters or leaves a null torque zone of a gear backlash mechanism, and a second step of initializing a control time and performing a control to restrict the effective torque to have a parabolic or exponential torque.

In one embodiment, the effective torque command is a value obtained by subtracting a drag torque from a motor torque command.

In another embodiments, the second step is performed if it is determined that the effective torque command enters or leaves the null torque zone.

In another further embodiment, the first step determines whether the effective torque command enters or leaves the null torque zone of the gear backlash mechanism by calculating whether the motor torque command (driver request torque) $T_{in}$ is greater than a sum $(T_{dead}/2+T_{drag})$ of a half of the null torque zone $T_{dead}$ and the drag torque $T_{drag}$ and whether a $T_{in}$ value of the previous sample time $T_{in\_old}$ is smaller than or equal to the sum $(T_{dead}/2+T_{drag})$ of the half of the null torque zone $T_{dead}$ and the drag torque $T_{drag}$.

In another related embodiment, the first step determines whether the effective torque command enters or leaves the null torque zone of the gear backlash mechanism by calculating whether the motor torque command (driver request torque) $T_{in}$ is smaller than a sum $(-T_{dead}/2+T_{drag})$ of the other half of the null torque zone $T_{dead}$ and the drag torque $T_{drag}$ and whether the $T_{in}$ value of the previous sample time $T_{in\_old}$ is greater than or equal to the sum $(-T_{dead}/2+T_{drag})$ of the other half of the null torque zone $T_{dead}$ and the drag torque $T_{drag}$.

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

In reference to certain preferred embodiments of the present invention, terms used in the present invention and an exemplary torque transmission state through a backlash mechanism formed by gear elements between a motor for a hybrid vehicle and driving wheels will be described with reference to FIGS. 1 and 3 below.

Figure 3:
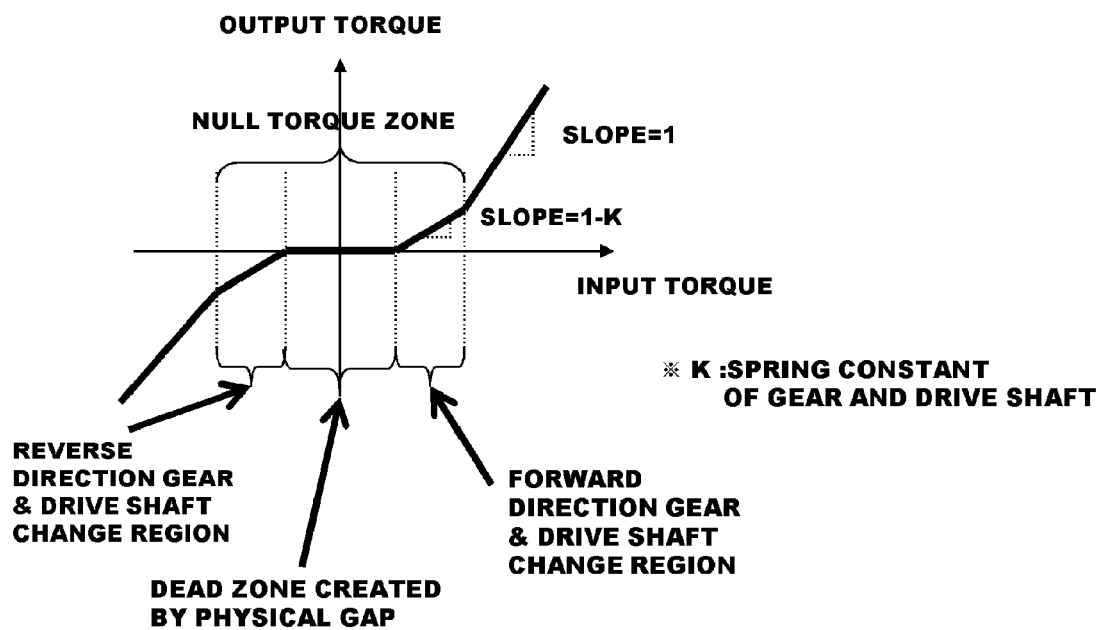
FIG. 3 is a torque waveform diagram illustrating a torque transmission state through a backlash mechanism formed by gear elements between a motor for a hybrid vehicle and driving wheels.

According to certain preferred embodiments of the invention, and as shown in FIGS. 1 and 3, a null torque zone represents a region suitably obtained by adding a dead zone, created by a physical gap between gears in a backlash model in which the gears are suitably modeled as a spring system, and a torque region, in which gears and a drive shaft are suitably deformed in the forward/backward direction approximated by springs.

According to a preferred embodiment of the invention, an input torque represents a torque (of a motor shaft) suitably input to a backlash mechanism, and an output torque represents a torque (of a drive shaft) suitably output to the backlash mechanism.

According to certain preferred embodiments of the invention, a drag torque preferably represents a resistance (drag) of an input terminal of the backlash mechanism and in further preferred embodiments also represents a rotational resistance of the motor itself, a fluid resistance of a wet clutch connected to the motor, etc.

Preferably, an effective torque is a value obtained by subtracting a drag torque from a motor torque and, accordingly, suitably represents a torque actually input to the backlash mechanism except for the load of the input terminal itself.

Moreover, a response delay represents the time to restrict the torque using a parabolic or exponential function when a torque command beyond the null torque zone is suitably input.

According to further preferred embodiments of the invention, a method for reducing vibration caused by gear backlash in a drive system for a hybrid vehicle in accordance with a preferred embodiment of the present invention will be described.

Figure 4:
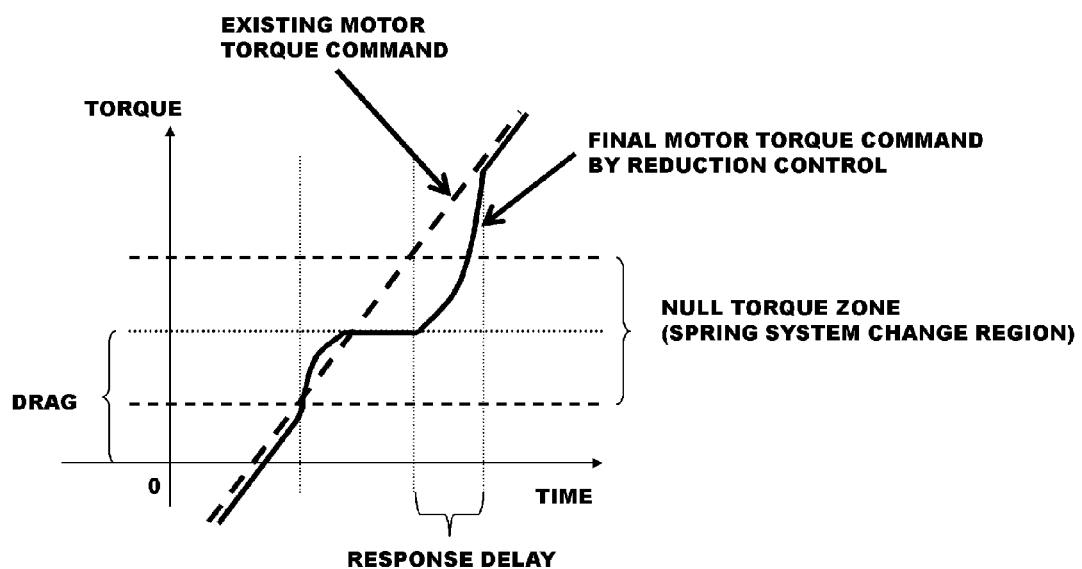
FIG. 4 is a conceptual diagram illustrating a method according to preferred embodiments of the invention for reducing vibration caused by gear backlash in a drive system for a hybrid vehicle in accordance with a preferred embodiment of the present invention.
Figure 5:
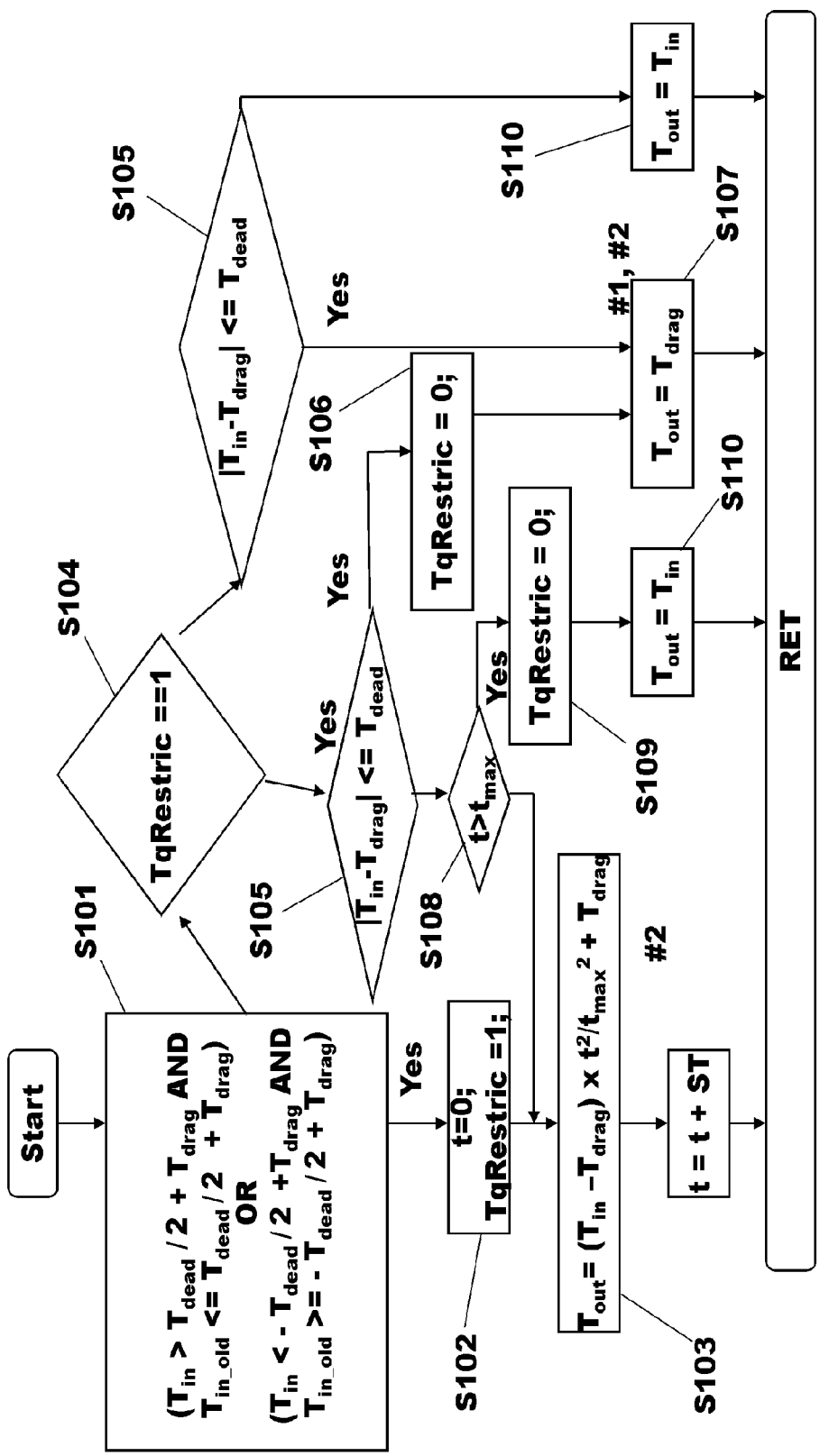
FIG. 5 is a flowchart illustrating a method for reducing vibration caused by gear backlash in a drive system for a hybrid vehicle in accordance with a preferred embodiment of the present invention.
Figure 6:
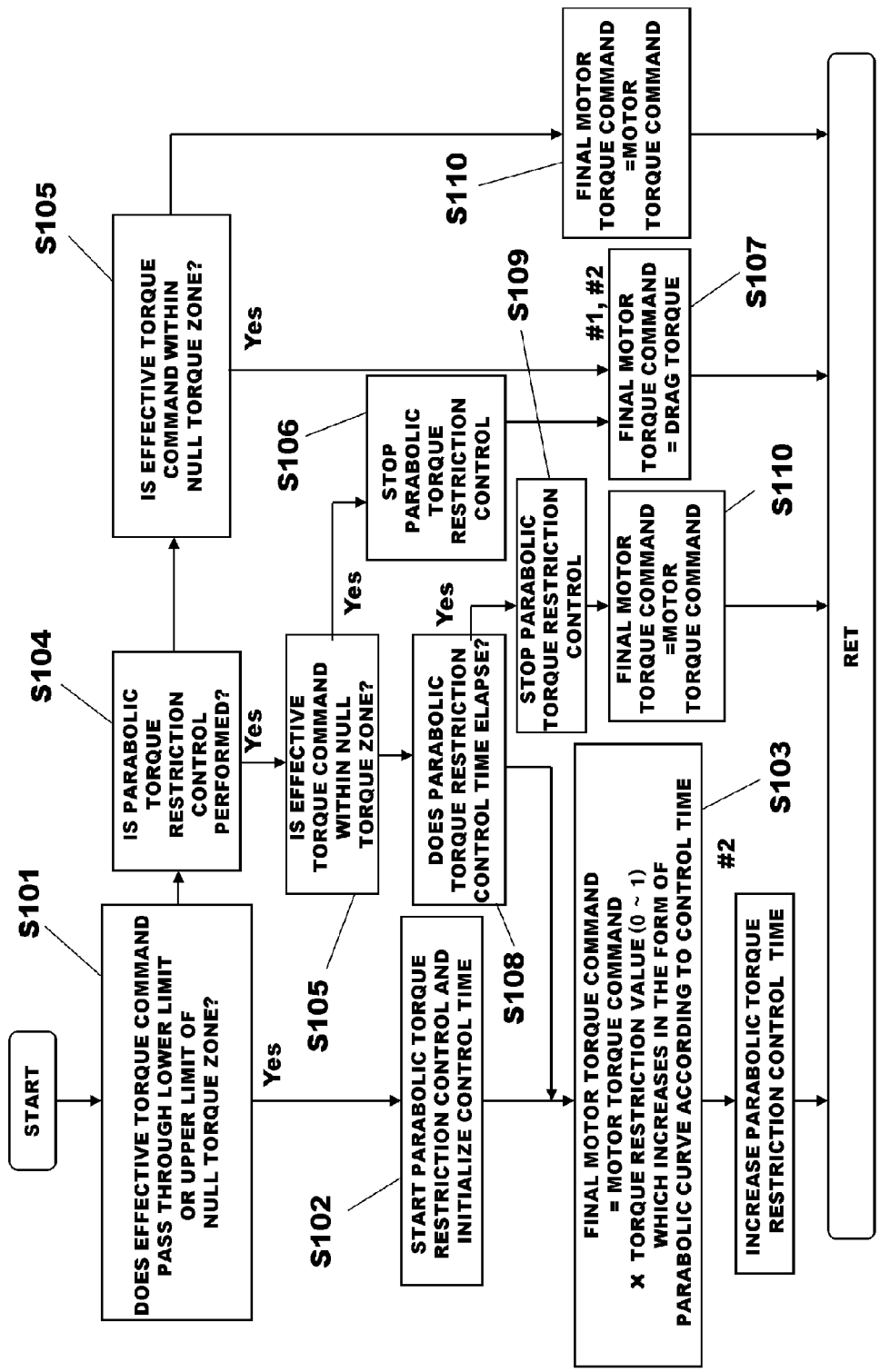
FIG. 6 is a flowchart illustrating a method for reducing vibration caused by gear backlash in a drive system for a hybrid vehicle in accordance with a preferred embodiment of the present invention.

FIG. 4 is a conceptual diagram illustrating a preferred method for reducing vibration caused by gear backlash in a drive system for a hybrid vehicle in accordance with a preferred embodiment of the present invention. FIGS. 5 and 6 are flowcharts illustrating the method of the present invention as performed according to preferred embodiments as described herein.

In an exemplary embodiment, first, it is determined whether an effective torque command, which is a value suitably obtained by subtracting a drag torque from a motor torque command (driver request torque), passes through a lower limit of the null torque zone of the gear backlash mechanism and enters the null torque zone and further it is suitably determined whether the effective torque command passes an upper limit of the null torque zone and leaves the null torque zone (S101).

That is, according to further preferred embodiments of the invention, it is determined whether the effective torque, which is a value obtained by subtracting a drag torque from a motor torque, enters the null torque zone of the gear backlash mechanism, exists in the null torque zone, or leaves the null torque zone (S101).

According to further preferred embodiments, it is further determined whether the motor torque command (driver request torque) $T_{in}$ is greater than a sum $(T_{dead}/2+T_{drag})$ of a half of the null torque zone $T_{dead}$ and the drag torque $T_{drag}$ and whether a $T_{in}$ value of the previous sample time $T_{in\_old}$ is smaller than or equal to the sum $(T_{dead}/2+T_{drag})$ of the half of the null torque zone $T_{dead}$ and the drag torque $T_{drag}$. According to other preferred embodiments, it is possible to determine whether the effective torque is suitably entering the null torque zone of the gear backlash mechanism, suitably exists in the null torque zone, or suitably leaves the null torque zone by determining whether the motor torque command (driver request torque) $T_{in}$ is smaller than a sum $(-T_{dead}/2+T_{drag})$ of the other half of the null torque zone $T_{dead}$ and the drag torque $T_{drag}$ and whether the $T_{in}$ value of the previous sample time $T_{in\_old}$ is greater than or equal to the sum $(-T_{dead}/2+T_{drag})$ of the other half of the null torque zone $T_{dead}$ and the drag torque $T_{drag}$.

Then, according to further embodiments, when the effective torque enters the null torque zone of the gear backlash mechanism, a control time is suitably initialized (t=0) from a point of time when the effective torque passes through the lower limit of the null torque zone, and a control (TqRestric=1) to suitably restrict the effective torque to have a parabolic torque is started (S102), in which TqRestric represents a control bit (parabolic torque restriction control bit) for the parabolic torque restriction control.

Preferably, when the effective torque enters the null torque zone, the effective torque has a curve in the form of $1-\exp(-\alpha t)$ using an exponential function and is suitably converged to the drag torque.

According to other preferred embodiments of the invention, when the effective torque gets out of the dead zone suitably created by a physical gap of the null torque zone of the gear backlash mechanism and leaves the null torque zone, a final motor torque command value $T_{out}$ becomes a torque restriction value (0 to 1) which increases in the form of a parabolic curve according to the control time (S103).

Accordingly, when the effective torque enters the null torque zone, the final motor torque command value $T_{out}$ is a changed motor torque command value output by the vibration reduction control of the present invention and is subjected to the parabolic torque restriction control by $[T_{out}=(T_{in}-T_{drag})*t^2/t_{max}^2+T_{drag}]$, in which $t_{max}$ represents the parabolic torque restriction control time, i.e., the response delay.

Preferably, a step (S104) of determining whether the control (TqRestric=1) to restrict the effective torque to have a parabolic torque is performed and a step (S105) of determining whether the effective torque command value is within the null torque zone are further preferably performed.

Thus, according to further preferred embodiments of the invention, if the effective torque command value is within the null torque zone, i.e., if a value $(T_{in}-T_{drag})$ obtained by subtracting the drag torque $T_{drag}$ from the motor torque command $T_{in}$ is suitably smaller than or equal to the half of the null torque zone $T_{dead}$, the parabolic torque restriction control is suitably stopped (S106) to determine the final motor torque command $T_{out}$ as the drag torque $T_{drag}$ (S107).

According to other embodiments of the invention, if the effective torque command value is beyond the null torque zone, i.e., if the value $(T_{in}-T_{drag})$ obtained by subtracting the drag torque $T_{drag}$ from the motor torque command $T_{in}$ is suitably greater than the half of the null torque zone $T_{dead}$, the parabolic torque restriction control time is checked (S108) and, if the control time elapses, the parabolic torque restriction control is suitably stopped (S109) to determine the final motor torque command $T_{out}$ as the motor torque $T_{in}$. (S110).

As described herein, the present invention provides the following effects.

According to preferred embodiments of the present invention, when the motor torque is preferably input to the gear elements having the gear backlash mechanism of the hybrid vehicle and enters and leaves the null torque zone of the gear backlash mechanism, the effective torque is suitably restricted using a parabolic or exponential function such that the torque is suitably increased and restored by the parabolic torque restriction control, thereby preventing the deterioration of response.

Preferably, since the effective torque is output as 0 (zero) in the null torque zone, it is possible to prevent vibration from being suitably generated.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A method for reducing vibration caused by gear backlash in a drive system for a hybrid vehicle, the method comprising:
a first step of determining whether an effective torque command, which is a value obtained by subtracting a drag torque from a motor torque command, enters or leaves a null torque zone of a gear backlash mechanism; and
in response to determining that the effective torque command enters or leaves the null torque zone, implementing a second step of initializing a control time and performing a control to restrict the effective torque to have a parabolic or exponential torque to reduce an amplitude of vibration and prevent deterioration of torque response.

2. The method of claim 1, wherein the first step determines whether the effective torque command enters or leaves the null torque zone of the gear backlash mechanism by calculating whether the motor torque command (driver request torque) $T_{in}$ is greater than a sum $(T_{dead}/2+T_{drag})$ of a half of the null torque zone $T_{dead}$ and the drag torque $T_{drag}$ and whether a $T_{in}$ value of the previous sample time $T_{in\_old}$ is smaller than or equal to the sum $(T_{dead}/2+T_{drag})$ of the half of the null torque zone $T_{dead}$ and the drag torque $T_{drag}$; or by calculating whether the motor torque command (driver request torque) $T_{in}$ is smaller than a sum $(-T_{dead}/2+T_{drag})$ of the other half of the null torque zone $T_{dead}$ and the drag torque $T_{drag}$ and whether the $T_{in}$ value of the previous sample time $T_{in\_old}$ is greater than or equal to the sum $(-T_{dead}/2+T_{drag})$ of the other half of the null torque zone $T_{dead}$ and the drag torque $T_{drag}$.

3. The method of claim 1, wherein in the second step, when the effective torque leaves the null torque zone, a final motor torque command value $T_{out}$ is subjected to a parabolic torque restriction control in which the effective torque increases in the form of a parabolic curve by $[T_{out}=(T_{in}-T_{drag})*t^2/t_{max}^2+T_{drag}]$.

4. The method of claim 1, wherein in the second step, when the effective torque enters the null torque zone, the effective torque has a curve in the form of $1-\exp(-\alpha t)$ using an exponential function and is converged to the drag torque.

5. The method of claim 1, further comprising the step of determining whether the parabolic torque restriction control is performed and, if the effective torque command value exists in the null torque zone, stopping the parabolic torque restriction control to determine the final motor torque command $T_{out}$ as the drag torque $T_{drag}$.

6. The method of claim 1, further comprising the step of stopping the parabolic torque restriction control to determine the final motor torque command $T_{out}$ as the motor torque $T_{in}$, if the effective torque command value leaves the null torque zone and thus the control time elapses.

7. A method for reducing vibration caused by gear backlash in a drive system for a hybrid vehicle, the method comprising:
a first step of determining whether an effective torque command enters or leaves a null torque zone of a gear backlash mechanism; and
in response to determining that the effective torque command enters or leaves the null torque zone, implementing a second step of initializing a control time and performing a control to restrict the effective torque to have a parabolic or exponential torque that reduces an amplitude of vibration and prevents deterioration of torque response.

8. The method for reducing vibration caused by gear backlash in a drive system for a hybrid vehicle of claim 7, wherein the effective torque command is a value obtained by subtracting a drag torque from a motor torque command.

9. The method for reducing vibration caused by gear backlash in a drive system for a hybrid vehicle of claim 7, wherein the second step is performed if it is determined that the effective torque command enters or leaves the null torque zone.

10. The method of claim 7, wherein the first step determines whether the effective torque command enters or leaves the null torque zone of the gear backlash mechanism by calculating whether the motor torque command (driver request torque) $T_{in}$ is greater than a sum $(T_{dead}/2+T_{drag})$ of a half of the null torque zone $T_{dead}$ and the drag torque $T_{drag}$ and whether a $T_{in}$ value of the previous sample time $T_{in\_old}$ is smaller than or equal to the sum $(T_{dead}/2+T_{drag})$ of the half of the null torque zone $T_{dead}$ and the drag torque $T_{drag}$.

11. The method of claim 7, wherein the first step determines whether the effective torque command enters or leaves the null torque zone of the gear backlash mechanism by calculating whether the motor torque command (driver request torque) $T_{in}$ is smaller than a sum $(-T_{dead}/2+T_{drag})$ of the other half of the null torque zone $T_{dead}$ and the drag torque $T_{drag}$ and whether the $T_{in}$ value of the previous sample time $T_{in\_old}$ is greater than or equal to the sum $(-T_{dead}/2+T_{drag})$ of the other half of the null torque zone $T_{dead}$ and the drag torque $T_{drag}$.

* * * * *